(12) United States Patent
Lercari

(10) Patent No.: US 10,354,507 B1
(45) Date of Patent: Jul. 16, 2019

(54) SYSTEM AND METHOD FOR ENABLING REMOVAL OF A SECURITY TAG DURING A SELF-CHECKOUT PROCESS

(71) Applicant: MASTERCARD INTERNATIONAL INCORPORATED, Purchase, NY (US)

(72) Inventor: Camila Lercari, New York, NY (US)

(73) Assignee: MASTERCARD INTERNATIONAL, INCORPORATED, Purchase, NY (US)

( * ) Notice: Subject to any disclaimer, the term of this patent is extended or adjusted under 35 U.S.C. 154(b) by 0 days.

(21) Appl. No.: 15/859,935

(22) Filed: Jan. 2, 2018

(51) Int. Cl.
  G08B 13/24    (2006.01)
  G06T 1/00     (2006.01)
  G06F 16/28    (2019.01)

(52) U.S. Cl.
  CPC ......... G08B 13/248 (2013.01); G06F 16/288 (2019.01); G06T 1/0007 (2013.01); G08B 13/2405 (2013.01); G08B 13/246 (2013.01)

(58) Field of Classification Search
  CPC .............. G08B 13/248; G08B 13/2405; G08B 13/246; G06T 1/0007; G06F 17/30604
  See application file for complete search history.

(56) References Cited

U.S. PATENT DOCUMENTS

| | | | |
|---|---|---|---|
| 7,593,873 B1 * | 9/2009 | Oakes, III | G06Q 20/32 705/26.1 |
| 7,830,711 B2 | 11/2010 | Kawamoto et al. | |
| 7,973,663 B2 | 7/2011 | Hall | |
| 8,473,363 B1 | 6/2013 | Oakes, III | |
| 8,963,717 B2 | 2/2015 | Mohiuddin et al. | |
| 9,026,462 B2 | 5/2015 | Lin et al. | |
| 9,396,622 B2 | 7/2016 | Van Nest et al. | |
| 9,460,597 B1 | 10/2016 | Clark et al. | |
| 2006/0175402 A1 * | 8/2006 | Maitin | G06Q 20/20 235/383 |
| 2009/0322529 A1 * | 12/2009 | Kangas | G08B 13/2417 340/572.1 |
| 2010/0082444 A1 * | 4/2010 | Lin | G06Q 20/042 705/17 |
| 2013/0278425 A1 * | 10/2013 | Cunningham | G08B 13/246 340/572.1 |
| 2014/0125800 A1 * | 5/2014 | Van Nest | G07G 3/003 348/143 |

(Continued)

FOREIGN PATENT DOCUMENTS

GB        2503720 A     1/2014

*Primary Examiner* — Nader Bolourchi
(74) *Attorney, Agent, or Firm* — Howard IP Law Group

(57) ABSTRACT

A computer-implemented method for facilitating the removal of a security tag from an article includes the step of generating a visual template indicating a preferred position of a security tag and an article identification element within a viewing screen of an imaging device. With the imaging device, capturing at least one image of the security tag, the article identification element and the article, and processing the at least one image to determine whether or not the security tag and the article identification element are attached to the same article. Upon determining that the security tag and the article identification element are attached to the same article, storing in a database an identifier of the security tag, an identifier of the article, and an indication of their association with the same article.

15 Claims, 9 Drawing Sheets

(56) References Cited

U.S. PATENT DOCUMENTS

| | | | |
|---|---|---|---|
| 2014/0351098 A1* | 11/2014 | Shafer | G06Q 10/087 |
| | | | 705/28 |
| 2015/0121833 A1 | 5/2015 | Vandrovcova et al. | |
| 2016/0239733 A1* | 8/2016 | Hertz | G06F 17/30887 |
| 2017/0046707 A1 | 2/2017 | Krause et al. | |
| 2017/0053506 A1 | 2/2017 | Alexis | |
| 2018/0189763 A1* | 7/2018 | Olmstead | G07G 1/0063 |

\* cited by examiner

SYSTEM AND METHOD FOR ENABLING REMOVAL OF A SECURITY TAG DURING A SELF-CHECKOUT PROCESS

CROSS-REFERENCE TO RELATED APPLICATIONS

None

FIELD OF INVENTION

The present disclosure relates to systems and methods for electronically enabling removal of security tags on articles.

BACKGROUND

Electronic article surveillance (EAS) systems are often used to minimize theft. One common feature of these electronic systems aimed at minimizing theft is to attach a security tag to an article in an effort to detect an unauthorized removal thereof from a given area. In some applications, an alarm is generated in response to such electronic detection. For example, a security tag may be attached to an article offered for sale by a retail store, and an interrogating signal transmitted proximate the entrance and/or exit of the store. The interrogation signal causes an element (e.g. a magnetic element) of the security tag to produce a detectable response if an attempt is made to remove the article without first detaching the security tag therefrom. The EAS system is configured to detect this response, and generate an alarm (e.g., visual and or audible signal) in response thereto. In this way, the security tag must be detached from the article in order to prevent the alarm from being generated.

Various implementations of technological processes for security tags exist. For example, a security tag may take the form of a housing (e.g. a plastic body) which includes a tack or pin-like attachment means. A portion of the pin may be inserted through an article to be protected and engage with an aperture formed in the housing (e.g., via a clamping mechanism). A security tag may be removed or detached from the article using an external detachment means, such as a hand-held tool or counter-mounted device. Once the pin is released from the tag housing, the pin and tag housing may be removed from the article. Likewise, so called "smart security tags", as referred to herein, include tags having a remotely-controllable internal locking mechanism as well as a means to receive one or more wireless control signals. A receiver and processing component arranged within the tag may be configured to generate a control signal for activating/deactivating a locking mechanism within the tag in response to the receipt of a valid code or PIN number associated with the particular security tag. In other embodiments, a security tag may not be fixedly attached to the article, but rather indirectly attached (e.g. via an adhesive) to another tag or label of the article. Rather than being physically removed, these passive tags may merely be deactivated by an EAS system during a checkout process such that an article and tag may be carried out of a retail store without triggering an alarm or alert. Security tags may also contain a radio frequency identification (RFID) element. The RFID element can be read by an RFID scanning device to obtain data therefrom.

While existing technological solutions of EAS systems and associated security tags help reduce theft, their implementation often causes undesirable delay. Current technological implementation requires customers to wait in lines to complete purchases, as the security tag must be removed from the purchased article so as not to trigger an EAS security alarm when leaving the store. A significant technical problem in the field involves how to enable a customer or user to remove a security tag in a self-checkout environment. Technical solutions that utilize smart security tags lack the ability to ensure that customers are only permitted to remove a particular security tag associated with or attached to an article or product that has been purchased (paid for), rather than that of a different (e.g. more expensive) article. This and other fraud-prevention tasks are typically carried manually by an agent (e.g. a retail associate/cashier) at the point of sale. Additional problems include the laborious and time consuming process of a store employee associating a particular security tag with a particular article prior to the article's placement on the sales floor. One current solution includes manually generating a database (e.g., at the time of tag attachment) identifying that a particular security tag is attached to a particular article or item, such that upon the later purchase of an article, a system having access to the database may indicate which security tag is permitted to be removed.

Accordingly, improvements to existing technological processes and systems for enabling the deactivation and/or detachment of security tags while improving anti-fraud provisions and minimizing labor and expense are desired.

SUMMARY

In one embodiment of the present disclosure, a computer-implemented method for facilitating the removal of a security tag from an article is provided. The method includes the step of generating a visual template indicating a preferred position of a security tag and an article identification element within a viewing screen of an imaging device. With the imaging device, at least one image of the security tag, the article identification element and the article is captured. The at least one image is subsequently analyzed for determining if the security tag and the article identification element are attached to the same article. Upon a determination that the security tag and the article identification element are attached to the same article, an identifier of the security tag, an identifier of the article, and an indication of their association with the same article is stored in a database.

In one embodiment, the step of analyzing the at least one image for determining if the security tag and the article identification element are attached to the same article includes the steps of identifying the security tag and the article identification element appearing in the at least one image, and determining one or more characteristics associated with the background of each image. The characteristics are then compared to one another for determining whether the security tag and the article identification element are attached to the same article. In an embodiment, upon determining that payment has been received for the article associated with the article identification element, the method further includes identifying a security tag associated with the purchased article, and generating and transmitting a control signal for enabling at least one of the detachment and deactivation of the identified security tag from the article.

In one embodiment, the step of generating a visual template indicating a preferred position of a security tag and an article identification element within a viewing screen of an imaging device comprises the steps of generating a first window indicating an area in which to position the security tag, and generating a second window indicating an area in which to position the article identification element.

In another embodiment of the present disclosure, a system for enabling the removal of a security tag from an article during a self-checkout process is provided. The system includes an imaging device configured to capture at least one image of a security tag, an article identification element or tag and an article, and a computer processor operatively connected to the imaging device. The processor is configured to analyze the at least one image for determining if the security tag and the article identification element are attached to the same article, and store in a database, upon a determination that the security tag and the article identification element are attached to the same article, an identifier of the security tag, an identifier of the article, and an indication of their association with the same article.

In still another embodiment, a mobile computing device is provided which includes an image capturing device, a wireless communication device and at least one processor operatively connected to the image capturing device and the wireless communication device. The processor is configured to utilize the image capturing device to obtain at least one image of a security tag, an article identification element and an article, and determine whether payment has been received for the purchase of the article associated with the article identification element. Upon confirmation of payment, the processor is further configured to identify a security tag associated with the purchased article, and generate and transmit a control signal for enabling at least one of the detachment and deactivation of the identified security tag from the article.

DETAILED DESCRIPTION

Figure 1:
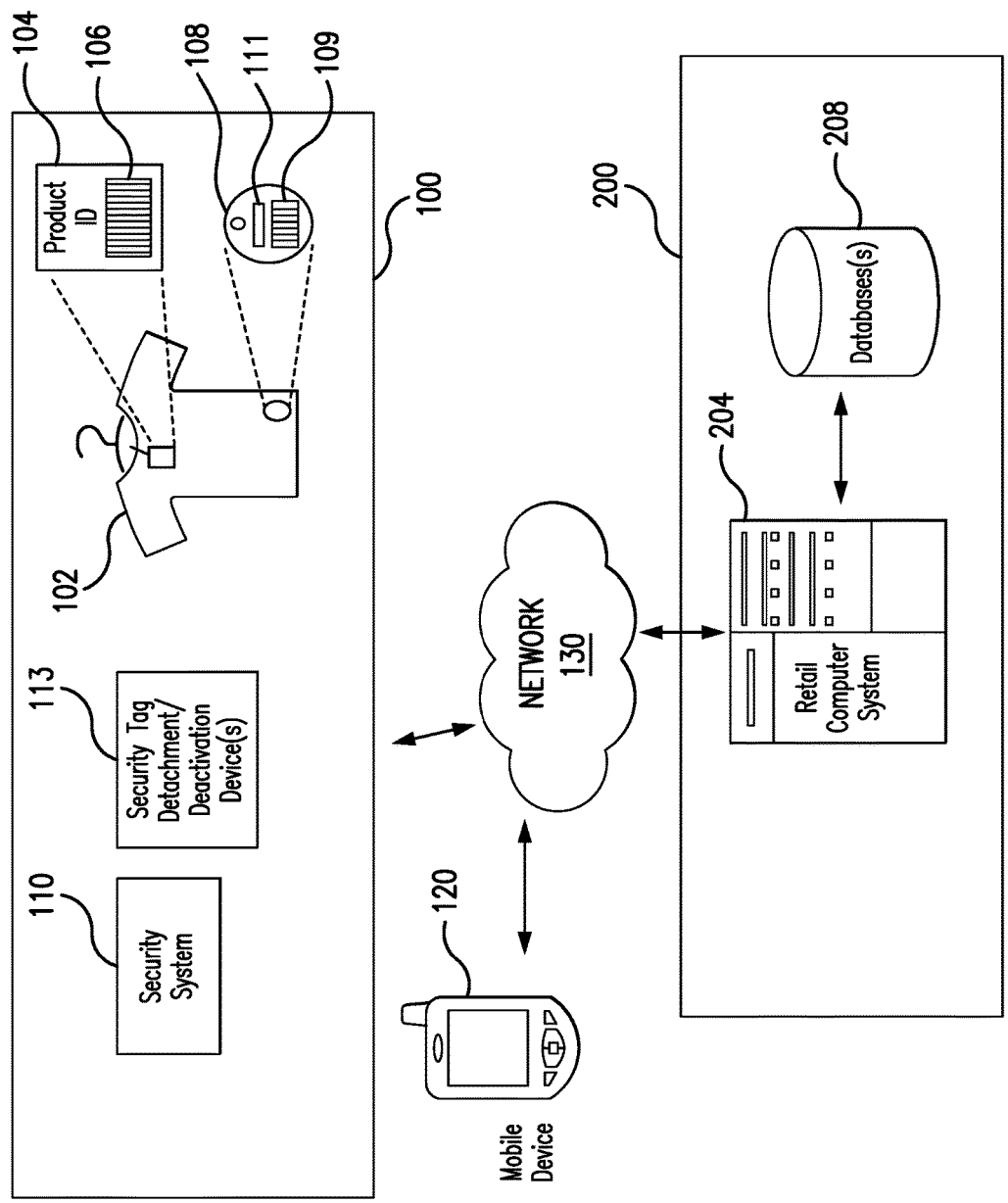
FIG. 1 illustrates an environment within which some embodiments of the present disclosure may be implemented.

It is to be understood that the figures and descriptions of the present disclosure have been simplified to illustrate elements that are relevant for a clear understanding of the embodiments described herein, while eliminating, for purposes of clarity, many other elements found in retail sales systems, and more generally, computing systems and wireless communication devices, such as mobile telephones or smartphones communicating with one or more remote computers or servers via a local, internet, cellular or satellite networks, as well as computer systems or mobile telephones running native or web-based applications or other software. However, because such elements are well known in the art, and because they do not facilitate a better understanding of the present invention, a discussion of such elements is not provided herein. The disclosure herein is directed to all such variations and modifications known to those skilled in the art.

As used herein, the term "processor" broadly refers to and is not limited to a single- or multi-core general purpose processor, a special purpose processor, a conventional processor, a Graphics Processing Unit (GPU), an Applications Processing Unit (APU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

The term "security tag", as used herein broadly refers to a device (such as a structure in a protective housing of a plastic or other radiofrequency transparent material) that is attached to an article for purchase. Security tags are regularly found in retail operations such as clothing and apparel stores. If a customer exits the store with an active security tag still attached to an article, a sensor (e.g. a magnetic or RFID sensor) positioned proximal the entrance/exit door will sense the encroaching tag and activate an alarm. Security tags generally do not contain any information about the associated articles, as they are desired to be interchangeable across multiple products. The term "paper tag", as used herein, broadly refers to an identifying tag or other article identification element attached to an article for sale and including information thereabout, such as description and price, as well an identifier or bar code such as a universal product code (UPC) or electronic product code (EPC) as understood in the industry. The term "barcode", as used herein, refers to a pattern or symbol that contains embedded data. Barcodes may be implemented as single or multi-dimensional barcodes. Barcodes and barcode reading applications and hardware are known in the art and therefore will not be described in detail herein.

Embodiments of the present disclosure include a user-accessible application, such as a software application running on a mobile phone (e.g., causing an application processing unit (APU) of the mobile phone to execute instructions) or an application running on a computer or process server arranged in a self-checkout area of a retail store. The application may also be integrated into, or work in conjunction with, a retail store's own digital or mobile checkout/payment application. During a self-checkout purchasing process of an article, the application is configured to access an imaging device (e.g., a mobile phone camera), and provide a user, such as by generating text and/or graphic image data on a screen display of a mobile phone, or by providing audio output, with instructions on how to scan or capture one or more images of a paper tag and a security tag attached to the article to be purchased (or a purchased article). In order to reduce fraud, the application utilizes image analysis or processing software (or transmits the image(s) to an external computing system implementing the same) for confirming that the security tag and the paper tag are indeed attached to the same article. Once the application confirms that the tags are attached to the same article, the application associates or matches the paper tag with the security tag. This may be achieved by associating a barcode or other individual identifier arranged on or associated with the security tag, with a barcode or product code arranged on the paper tag. This association or relationship may be saved in a data store for current or future reference.

If the article has yet to be purchased, a customer proceeds to pay for the article (e.g., via the mobile checkout application or at a self-checkout terminal). Upon determination by the application that payment for the article has been received, such as by receipt of data from a mobile checkout application or self-checkout terminal indicative of receipt of payment for the article, or accessing records in a data storage device storing records indicative of payment, the application is configured to enable the removal of only the specific security tag associated with the purchased article. This may be achieved by sending a wireless control signal (which may contain a unique PIN or other code for unlocking the tag) to a smart security tag attached to the article. The smart security tag then receives the PIN and releases itself from the article. In another embodiment, the self-checkout application is operatively connected to, or in wireless communication with, a discrete physical security tag removal device. The security tag removal device is associated with a scanner for reading a barcode or identifier on a security tag. In this way, by scanning the security tag identifier, the system may determine that the scanned barcode matches or is associated with an article that has been identified as properly purchased. Upon such a determination, the removal device is enabled and the customer may manually remove the security tag using the device.

Referring generally to FIG. 1, embodiments of the present disclosure will be described in the context of an exemplary retail operating environment. A retail store 100 may house and display products or items sale, such as exemplary clothing article 102. Article 102 generally includes an identification element or paper tag 104, which may include a UPC or barcode 106 arranged or printed thereon. Article 102 is further fitted with an exemplary security tag 108 which also may include a barcode 109 or other form of unique identifier arranged on an exterior surface thereof. In other embodiments, the unique identifier may take the form of an RFID component arranged internally within the device. Security tag 108 may comprise a smart security tag, having internal components 111, such as a wireless transceiver, processing components, and/or locking mechanism facilitating at least the unlocking and detachment of the tag from an article in response to a received wireless control signal (e.g., a coded signal), as described above.

Security tag 108 forms part of a security system 110, such as an EAS system, implemented within retail store 100. Security system 110 includes hardware and software to monitor, for example, active security tags and alert store personnel if a security tag (e.g., security tag 108) has been removed from a perimeter or location (e.g. the bounds of the retail store floor) defined by security system 110 without authorization, by way of example only. In embodiments which do not utilize a remotely-controllable smart security tag, as described above, discrete security tag detachment or deactivation devices (which may include optical scanners or image capturing devices) may be provided, enabling a customer to manually remove a security tag after successful completion of a self-checkout process.

In the self-checkout environment, a customer may purchase an article (e.g., article 102) using a software-based retail sales application running on their personal computing or communication device 120. Personal computing device 120 may comprise, by way of example only, a cellular or smart phone, a portable computer, tablet or the like. While embodiments of the present disclosure will be described in the context of a customer utilizing a smart phone for performing embodiments of the present disclosure, it should be understood that a public computer and associated interface located within the retail store (e.g., a computer terminal installed in a self-checkout area) may replace the role of personal computing device 120.

Figure 2:
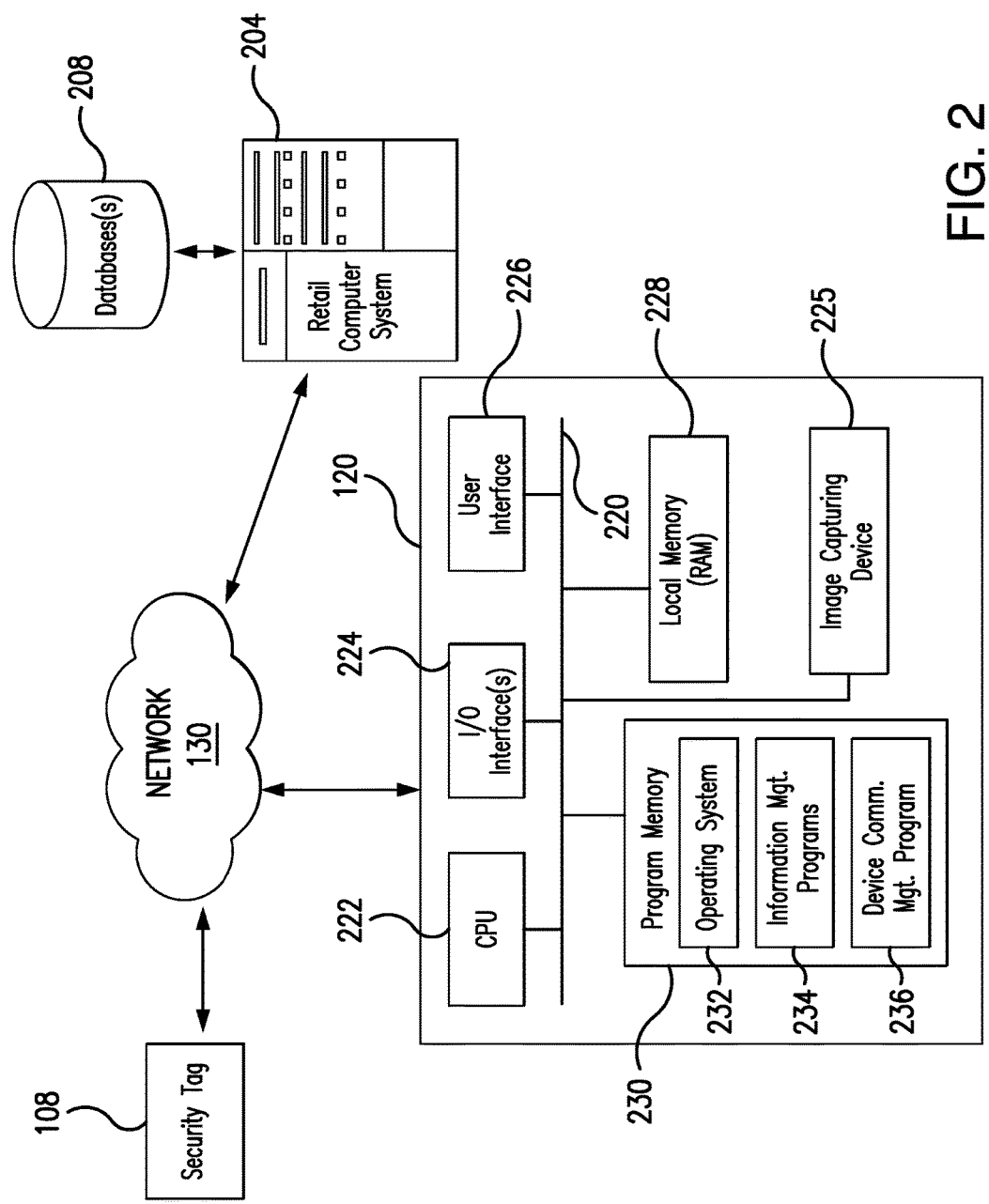
FIG. 2 is a functional block diagram of a computing device interfacing with components in the environment of FIG. 1 in accordance with an exemplary embodiment of the present disclosure.

FIG. 2 provides a more detailed diagram of an exemplary personal computing device 120 or in-store computer useful for performing embodiments of the present disclosure. Personal computing device 120 includes a data bus 220 providing communication among system components. One or more computer processors, designated by central processing unit (CPU) 222, is in communication via data bus 220 with components including program memory 230, local memory 228, user interface(s) 226 (e.g., a touch-screen display), input/output interface 224, and an image capturing device (e.g., a camera or scanner) 225. Program memory 230 stores programs including an operating system (OS) 232, which manages the computer hardware and provides common services for efficient execution of various logic circuitry including hardware, software and/or programs. Program memory 230 further stores one or more applications or programs 234, which include computer-executable instructions to execute rules to perform the processing described herein. These processes may include, but are not limited to the purchasing or retail items, the capturing and analysis of images of items including paper tags, security tags, and consumer articles, the disablement of security tags upon completion of a verified purchase process, as well as the control of communications between personal computing device 120 and other internal and/or external devices or databases. Personal computing device 120 further includes device communication management program 236, which includes computer-executable instructions to manage communications, including communications of data to and from personal computing device 120 and external systems. Processor 222 (or CPU) carries out the instructions of computer programs, which operates and/or controls at least a portion of the functionality of personal computing device 120. Program instructions may be loaded into local memory 228 for efficient and high-speed execution by CPU 222. Programs may be arranged in one or more modules, and functionality of programs may be implemented in program code that may be arranged as one or more programs or modules, which need not be stored on a same memory device, or executed by a single CPU.

Personal computing device 120 includes device input/output interface 224 configured to receive and output data and information to and/or from personal computing device 120 from and/or to peripheral devices and networks operatively coupled to the system. Such networks may include exemplary internet network 130, which manages communications among, for example, external computer systems, such as a retail computer system 204 facilitating retail transactions and associated databases 208. The I/O interface 224 may include a query interface configured to accept and parse requests from personal computing device 120 and any external systems, and pass those requests to CPU 222 for processing using instructions of device communication management program 236. Input/output interface 224 may include one or more radio frequency communication devices or near-field communication (NFC) facilitating communications as described herein. Protocols implemented by these devices may include wireless network protocols (IEEE, Bluetooth, NFC, etc.), and cellular communication protocols.

Program memory 230 may include one or more of any form of data storage device including but not limited to electronic, magnetic, optical recording mechanisms, combinations thereof or any other form of memory device capable of storing data. The CPU 222 may be in the form of one or more computer processors, or may be in such forms as a distributed computing system, a centralized computing system, a network server with communication modules and other processors, or nearly any other automated information processing system capable of executing instructions stored in program memory.

Each or any combination of the modules and components shown in FIGS. 1 and 2 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure.

Referring again to FIG. 1, the exemplary retail environment further comprises a back-end system 200 for facilitating and managing retail transactions, by way of example only. This platform is embodied as retail computer system 204 and associated database(s) 208, which may be remotely located (e.g., at a facility associated with the retailer's operations or corporate offices). Databases 208 may store a wide range of data used to facilitate remote transactions, including, but not limited to, article information (e.g., inventory, price, description correlated to a barcode or other identifier associated with the product), information relating to security tags (e.g., tag identification information and related passcodes or PINs), as well as associations between paper tags and security tags generated according to embodiments of the present disclosure, as will be set forth in greater detail herein.

Generally, retail transactions may include communicating information regarding an article intended to be purchased from mobile or personal computing device 120 (e.g., communicating a barcode captured by the devices camera) to retail computer system 204 via network 130. It should be understood that network 130 is merely representative, and may comprise one or more interconnected communications networks (e.g., a LAN and/or a wireless cellular accessing the internet). The retail transactions enabled by the illustrated system may further include the use of one of any number of payment systems in order to facilitate the remote payment and confirmation thereof of the article in question (i.e., the article associated with the captured barcode). Payments systems include, but are not limited to credit or debit card payment systems, automatic clearing house (ACH) payment systems, or any other suitable form of electronic payment.

Figure 3:
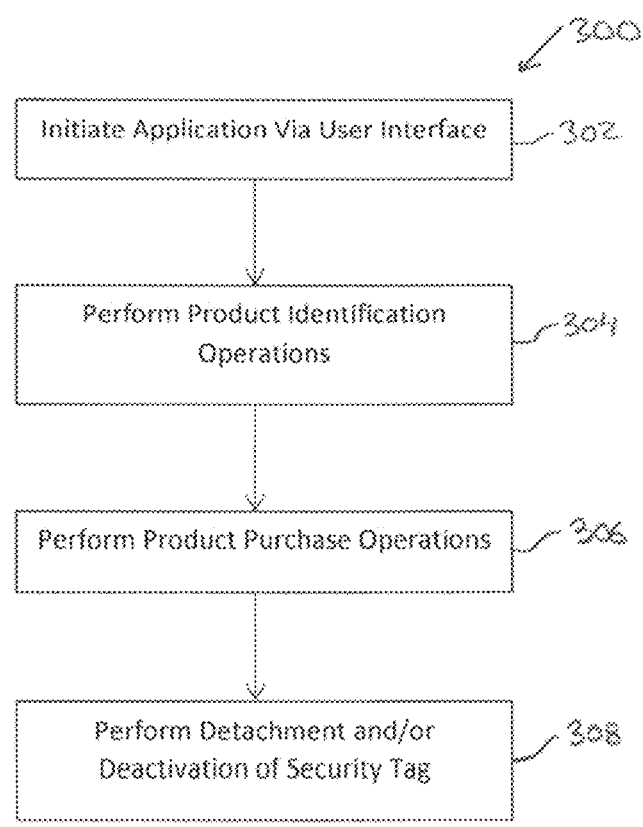
FIG. 3 illustrates a process flow diagram of an exemplary consumer self-checkout process.

Referring now to FIG. 3, a simplified process diagram describing an exemplary retail sales transaction performed within the environment of FIG. 1 is provided. An exemplary self-checkout process 300 may be initiated by a customer shopping in a retail space via their mobile computing device (e.g., device 120 of FIGS. 1 and 2). A purchase transaction may begin with the customer launching or initiating 302 a self-checkout application via the user-interface of their computing device. Once launched, the user may perform 304 operations for identifying the article or product for purchase in response to an instruction provided by the application. This may include, by way of non-limiting example, scanning or capturing an image of the article's paper tag, including an identifying feature or symbol such as a barcode arranged thereon.

After obtaining identifying information regarding the article to be purchased, data exchanges may be performed between the application and a retail computer system (see FIGS. 1 and 2). Such exchanges may include matching the article identification information with inventory, pricing, and other information which may be provided by the retail computer system to the application. Upon establishment of the article price, the customer may perform 306 purchasing operations via the application. These operations may include, for example, entering payment information (e.g. credit card information) into the device, or identifying an automated payment method which the application may initiate in order to facilitate payment. Any known automated system for acquiring the payment information can be used without limitation. The payment information can alternatively or additionally be obtained from a remote data store based on a customer identifier or account identifier.

After an article has been successfully purchased, a security tag detaching/deactivation process can be initiated, wherein the customer detaches 308 a security tag from the article. In one instance, the customer may initiate the security tag detaching/deactivation process after being prompted by the application on their mobile device. The mobile device may be used to capture security tag identification information, such as via a barcode or other identifier arranged on the security tag, or via an NFC data exchange between the mobile device and the security tag. This identification may be used to facilitate the unlocking and detachment, or deactivation of the security tag. For example, in the case of a smart security tag, the application may access a database (e.g. database 208 of FIGS. 1 and 2) for identifying a passcode, PIN, or other information required to initiate the detachment or deactivation of the security tag. The application may be further configured to facilitate use of the mobile device to wirelessly communicate the passcode to the security tag after the authorization for release has been received. The security tag is responsive to receipt of the passcode to deactivate a locking mechanism of the security tag or deactivate the security tag. In order embodiments, an external security tag detachment device may be fitted with a scanner, wherein the scanner may be activated or enabled by the scanning of the security tag identifier which corresponds to the identifier captured by the user with their mobile device.

As set forth above, the self-checkout process of FIG. 3 remains vulnerable to retail theft due to the lack of an association between the article's paper tag and the security tag. More specifically, the above-described operation does not provide any means to ensure that the security tag that is being deactivated or detached is the security tag attached to the purchased item. In this way, theft may occur by a customer purchasing an article, but deactivating the security tag of a different (e.g., more desirable) article. One way to combat this practice would be for store employees, for example, to associate a paper tag of an article with a security tag attached thereto in advance of the purchase. This association may be achieved by scanning both an article's paper tag and identifier (e.g., a barcode) and an identifier (e.g., a barcode) of the security tag affixed thereto. In this way, software may be used to associate the two together, and store the association in a database for future reference. With this association stored in advance, upon receipt of data indicative of receipt of payment for the article, the systems described herein may enable the unlocking or deactivation of only the particular security tag previously associated with the unique article (or paper tag thereof). However, as set forth above, these operations are time-consuming, expensive, and therefor undesirable.

Figure 4:
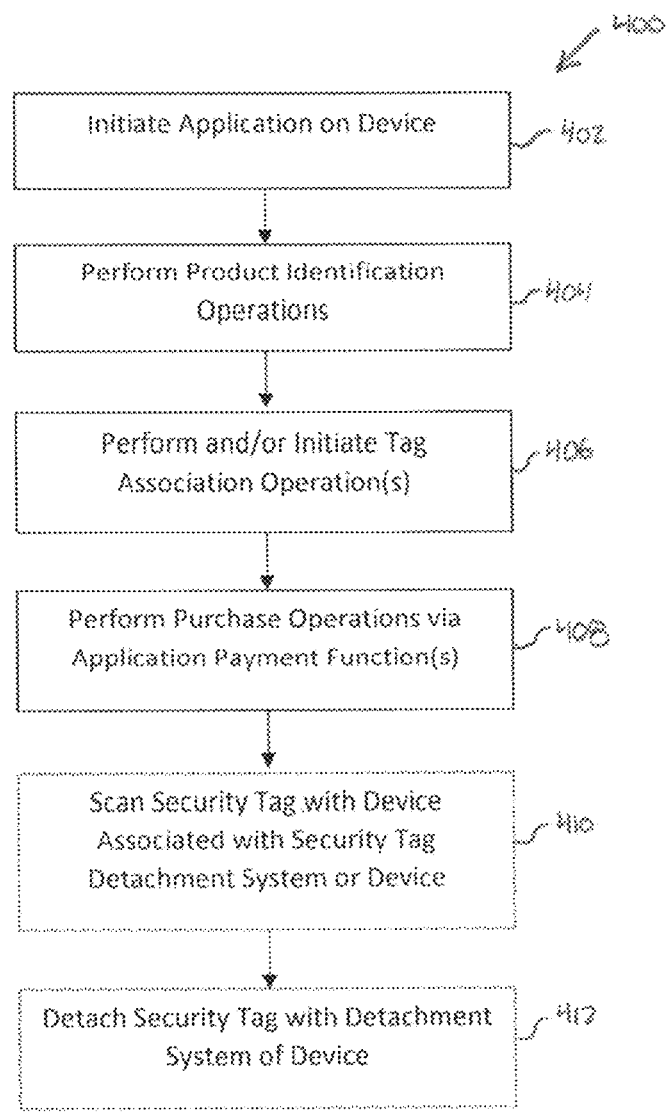
FIG. 4 illustrates a process flow diagram of an exemplary self-checkout process according to embodiments of the present disclosure.

Embodiments of the present disclosure remedy the above-described technical problem by requiring the customer to perform a paper tag and security tag association operation aided by processing operations in accordance with embodiments of the present disclosure and performed at least in part by their mobile device (as well as a retail computer system and/or a computer system associated with the stores security system). Referring generally to FIG. 4, a process 400 to be carried about by a customer for completing a self-checkout purchase according to embodiments of the present disclosure is shown. The customer may initiate 402 a self-checkout application on their mobile computing device as set forth above. In an optional step, the customer may be prompted to perform 404 product identification operations by, for example, capturing an image of at least one of the paper tag and associated product identifier. As described above, this operation may be used to facilitate payment processing.

Figure 5:
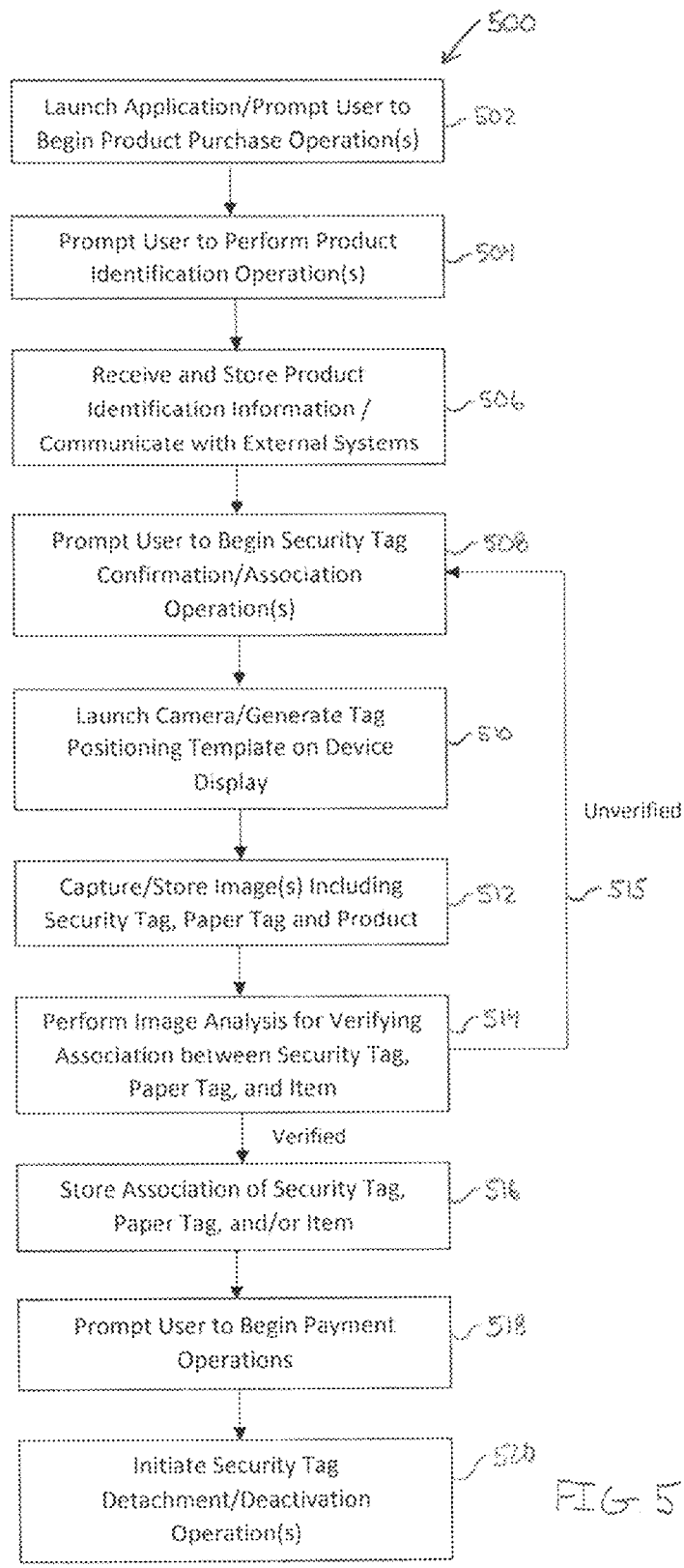
FIG. 5 illustrates a process flow diagram of an exemplary self-checkout process according to embodiments of the present disclosure.
Figure 6:
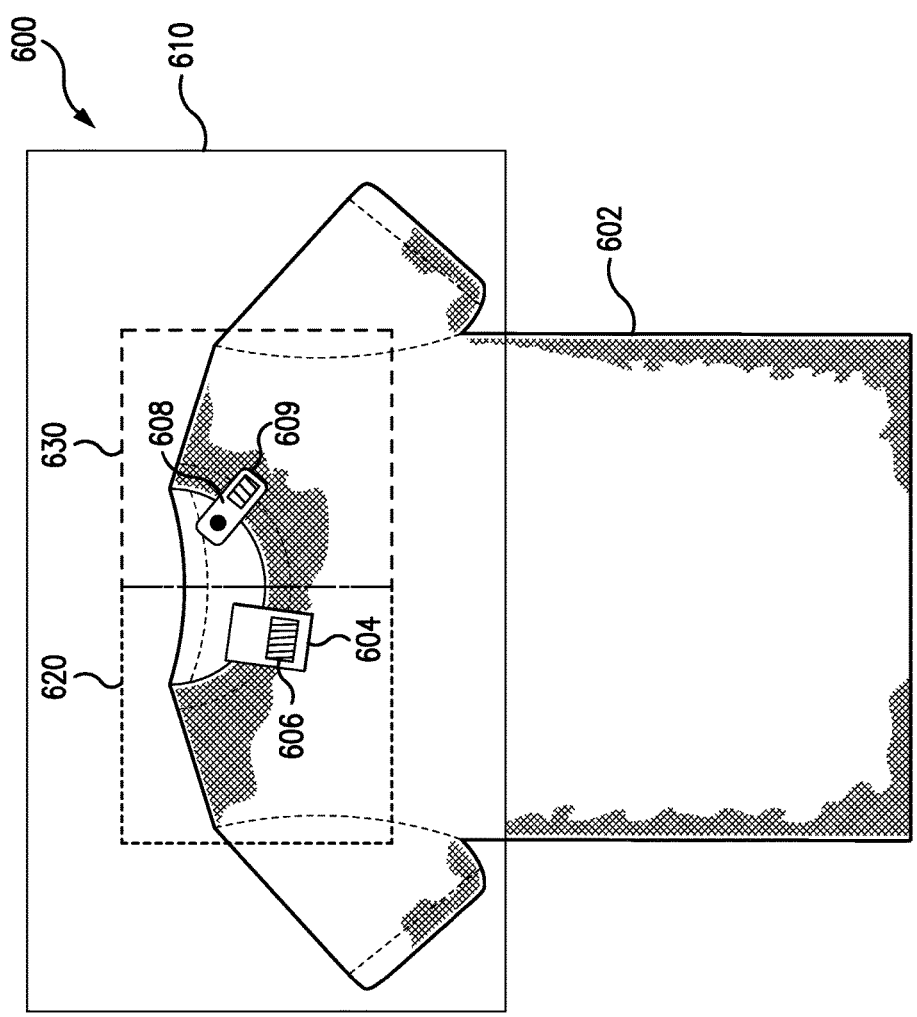
FIG. 6 is a graphical illustration of an aspect of an improved self-checkout process step for verifying a relationship between a security tag, an article or product identification tag, and a retail article according to an embodiment of the present disclosure.

As will be set forth in greater detail with respect to FIGS. 5 and 6, applications according to embodiments of the present disclosure may prompt a customer to perform or initiate 406 tag association operations, in which an association (or established relationship) between a paper tag and a security tag may be generated. This may be achieved by performing image analysis operations on one or more images of the paper tag and/or the security tag with the goal of verifying that these tags are attached to the same article. These images may comprise the separate images used to capture identification information of the paper tag and security tag, or a single image containing both tags within a single frame. Image processing software may be implemented (by one or more of the mobile device, security computer, retail computers, etc.) to analyze the image. This analysis may include, but is not limited to, the recognition and/or identification of colors, fabric types, fabric densities or transparency, and/or patterns appearing in the image or image background (and any discontinuities appearing therebetween) in order to confirm each tag's arrangement or fixation on the same article. The analysis may include generating one or more data files having data indicative of the images or portions of the respective images, and performing a comparison of the data files to determine similarity within one or more thresholds. For example, image analysis may identify portions of each image having a similar background, and excluding the portion including the respective tags, and extract those image portions. Histograms, such as color histograms, texture scale histograms, and the like, of each of the extracted image portions may be generated. The histograms may be compared to one another, via various suitable techniques, such as by determining differences for each category in the histograms, summing the differences, and comparing the difference to a threshold. If a verification may can be made that the security tag and paper tag are attached to the same article or product, the application is configured to store an indication of this association between the paper tag with the security tag. This may be achieved by storing on a database (e.g., database(s) 208 of FIGS. 1 and 2) the relationship between a barcode identifier or other identifier arranged on or associated with the security tag, with a barcode or product code arranged on the paper tag. It should be understood that steps 404 and 406 may be combined into a single operation, wherein the image(s) used to verify and associate the paper tag and the security tag may also be used to acquire the article and/or security tag identifiers for facilitating payment and security tag detachment operations. It should further be understood that security tag and paper tag association operations may be performed before or after payment operations without departing from the scope of the present invention.

Once the application confirms (or receives said confirmation from a remote computing system) that the tags are attached to the same article, the customer may perform 408 purchase operations via, for example, the above-described payment operations. After the payment receives data indicative of payment, the security tag may be automatically unlocked by the application via wireless transmission of an unlock code to the security tag. Once unlocked, a user may remove 412 the security tag from the article. Likewise, in the case of a passive (e.g., non-permanently affixed) security tag, the application may facilitate its deactivation. In embodiments which do not utilize a smart security tag with an on-board controllable locking mechanism or passive tag, a user may scan 410 the security tag with an optical scanning element associated with an external security tag removal device. The device or control system associated therewith may access one or more databases to confirm that the scanned security tag has been associated with an article or item that has been successfully paid for. Upon confirmation of the same, the device will enable itself, allowing the user to manually detach the security tag.

Referring now to FIG. 5, a more detailed process flow illustrating an operation 500 of a self-checkout application running on an exemplary customer mobile device according to embodiments of the present disclosure is shown. After being launched, the application is configured to prompt 502 (e.g., via text-based queries displayed on the mobile device) a customer if they wish to begin a self-checkout operation. In response to an indication by the user (e.g., an input confirming the desire to purchase an article), the application may further prompt 504 a customer to perform product identification operations, such as capturing an image of a barcode arranged on a paper tag of the article with a camera of their device. The application may automatically launch the camera application, or launch the camera application in response to a customer's input indicating that they are prepared to begin the process.

After obtaining identifying information regarding the article to be purchased, data exchanges 506 may be performed between the application and a retail computer system (see FIGS. 1 and 2). Such exchanges may include matching the article identification information with inventory, pricing, and other information which may be provided by the retail computer system to the application.

The application may prompt 508 a customer to begin tag association operations in accordance with embodiments of the present disclosure. The application is configured to launch 510 a camera of the mobile device, and generate a visual template or tag positioning aid on a screen of the device (i.e., generate a visual template on the view finding screen associated with the running camera application). As described herein in reference to FIG. 6, the template is configured to aid a customer in arranging both the security tag and the paper tag of an article in a predetermined position with respect to one another for the purpose of aiding subsequent image analyses or processing operations. Automatically after determining that the tags and article are arranged within the generated template, or in response to a customer action indicating the same, the application is configured to capture 512 one or more images of the security tag, paper tag and article. Once captured, using software running either on the device, or an external computer system, is used to analyze 514 the image(s) for the purpose of determining if the security tag and the paper tag are attached to the same item.

If the result of the image analyses is a determination that the tags are not attached to the same article, or if the association cannot be determined with adequate confidence, the application may repeat 515 the operation, again prompting 508 the customer to begin the tag association process (or cancel the transaction entirely). If the image analysis results in a determination that the paper tag and security tag are attached to the same article, the application is configured to store 516 (e.g., in database(s) 208) data indicating the association between the two tags. This association may comprise storing an identifier of the paper tag (e.g., its barcode) with an identifier of the security tag (e.g., its barcode) confirmed to be associated therewith. Upon confirmation of a successful pairing of the security tag and the paper tag, the application may prompt 518 the customer to begin payment operations, and upon completion thereof, and receipt of data indicative of payment, initiate 520 security tag detachment or deactivation operations for the tag associated with the paper tag/purchased article as described in detail above.

FIG. 6 provides a visual representation 600 of an exemplary tag association process according to embodiments of the present disclosure. As set forth above, embodiments of the present disclosure may be configured to launch a camera of a customer's mobile device. As would be understood, the camera application may be configured to utilize the display of the device as a viewfinder having a viewing window 610. Within window 610, the application may be configured to generate a visual template defining or identifying areas or the viewing windows in which to place a paper tag 604 and a security tag 608 of an article 602 to be purchased. In the illustrated embodiment, the application is configured to generate a template comprising two adjacent windows 620, 630 indicating fields in which to place or position paper tag 604 and security tag 608, respectively. The application may differentiate each window 620, 630 via the use of discrete colors (e.g., a red window for the security tag and a blue or green window for the paper tag) or line patterns as shown. It should be understood that the application may provide instructions to the user (e.g., via text displayed on the device) regarding how to position the tags and/or article using the generated template. Upon software recognition that the tags are arranged as illustrated, or in response to a customer indicating the same, the application may initiate the capture of an image of the security tag, paper tag and article. This image may be analyzed on the device or transmitted to an external system for analysis. The analysis may include, but is not limited to, the recognition and/or identification of colors, fabric types, fabric densities or transparency, and/or patterns appearing in the image or image background (and any discontinuities appearing therebetween), and/or generation and comparison of histograms, in order to determine if each tag's arrangement on the same article.

In one exemplary image analysis process, image segmentation and object recognition processing techniques may be utilized. More specifically, the image processing software may be configured to analyze the image in order to identify or confirm the presence and location of paper tag 604 within window 620 and security tag 608 within window 630. Once identified, the application may analyze portions of the image immediately surrounding, or more generally in the background of, each of the identified tags. The application may compare background characteristics surrounding each tag, and determine if the backgrounds surrounding each tag sufficiently match so as to indicate that the tags share a common background, and thus are attached to the same article. In alternate embodiments, or in addition to the above-described embodiments, the image processing may include processing configured to identify the article itself as a third discrete object, and determine if the identified tags are in sufficient proximity to, or lie within the bounds of, the article without any discontinuities appearing therebetween. It should be understood, however, that numerous other image processing techniques and operations may be implemented without departing from the scope of the present disclosure. The detailed description of these and other useful image analysis techniques are known, and not included herein for the purpose of brevity.

In a further embodiment, the image processing software may be further configured to analyze paper tag 604 and security tag 608 and capture their respective barcodes or identifiers 606,609. In this way, separate scanning or image capturing operations (e.g., steps 404 and 504 of FIGS. 4 and 5) may be eliminated, or performed contemporaneously with the image analysis, reducing the necessary steps required to be performed by a customer to complete the purchase transaction. Accordingly, an exemplary self-checkout process according to embodiments of the present disclosure may include only a single image capturing operations for facilitating both the association of the security tag and paper tag of an article, as well as the processing of payment operations therefor.

Figure 7A:
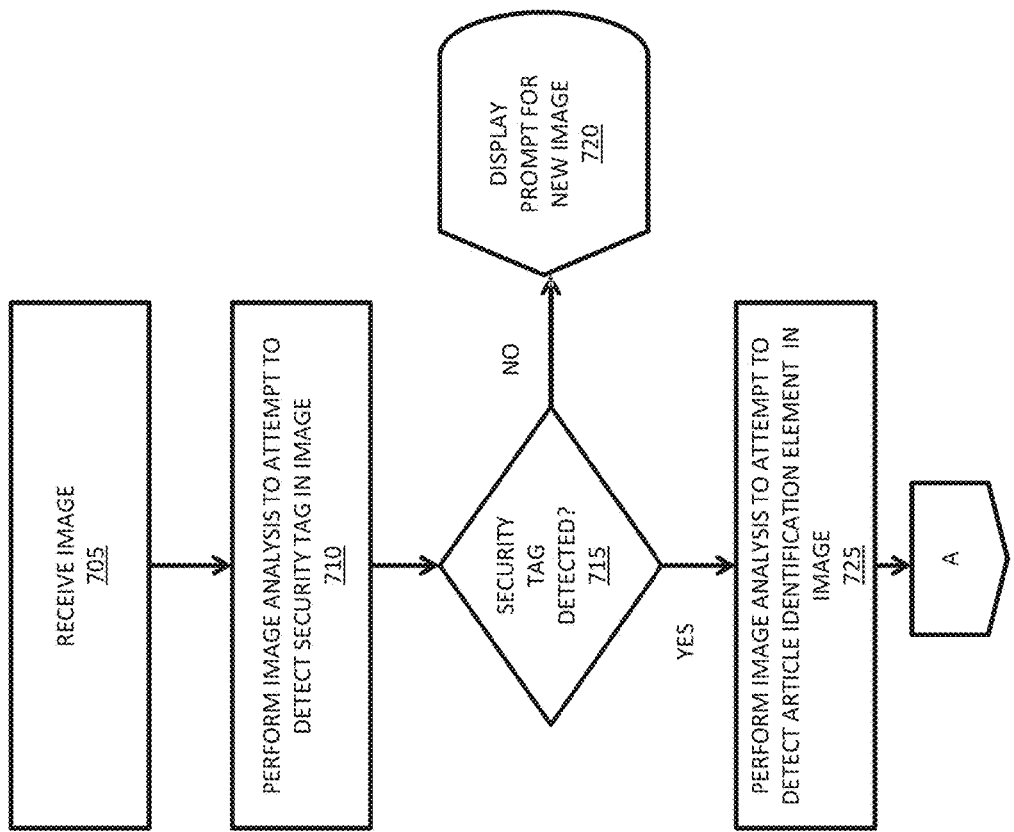
FIGS. 7A-7C illustrate a process flow of a computer-implemented method for enabling removal of a security tag from an article in another embodiment.
Figure 7B:
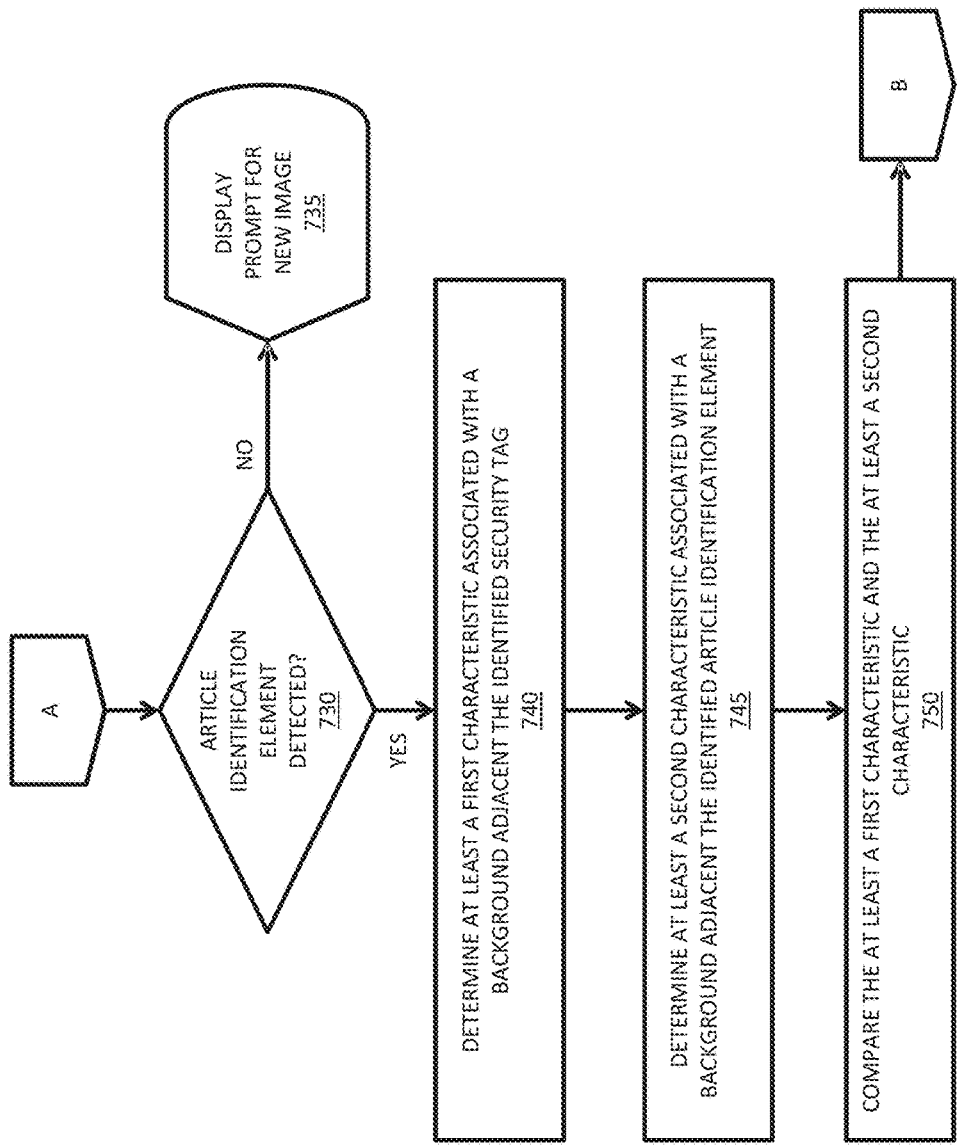
Figure 7C:
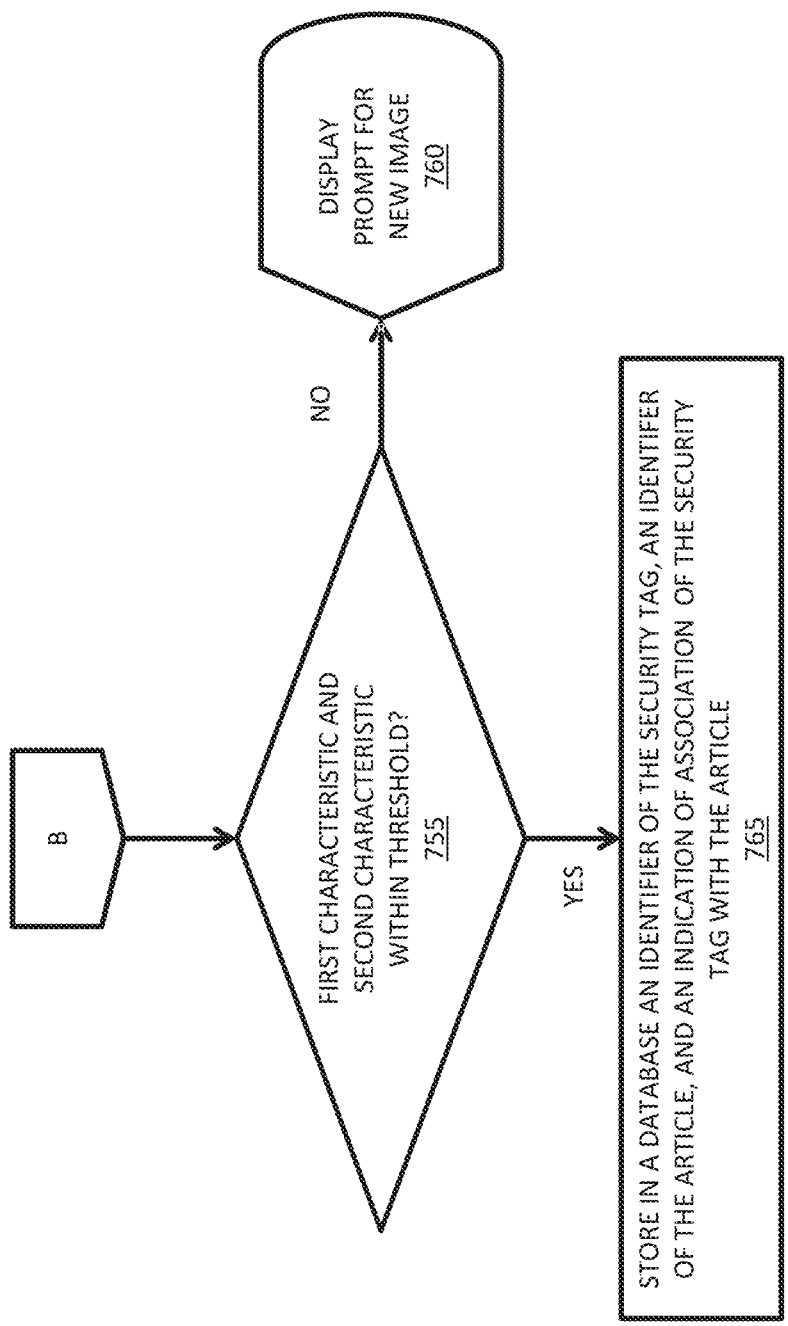

Referring now to FIGS. 7A-7C, a process flow of a computer-implemented method for enabling removal of a security tag from an article will be discussed. An image is received 705. The image may be a digital image captured by a camera of a device, such as a mobile phone. The image may be stored as a suitable format file in a data storage medium, such as local memory or a memory card, of a mobile phone. A processor of the device may then access the image file and perform 710 image analysis to attempt to detect a security tag in the image. The determination of whether a security tag appears in the image may include determining whether a barcode of a type and sequence associated with the security code is identified. If no security tag is identified 715, the process flow may proceed to generate an alert, such as a prompt 720 on a display screen of a device, for a user to capture another image. If the security tag is identified, the processor may further perform 725 image analysis of the image file to determine whether an article identification element appears in the image. Referring now to FIG. 7B, responsive to a determination 730 that the article identification element has not been detected, the process flow may proceed to generate an alert, such as a prompt 735 on a display screen of a device, for a user to capture another image. Responsive to detecting an article identification element, the process flow proceeds to determining 740 at least a first characteristic associated with a background adjacent to or surrounding the identified security tag. This step may include identifying one or more borders of the tag, extracting a portion of the image representing an area adjacent to the border of the tag, and determining at least a first characteristic, such as by generating a histogram of properties of pixels, such as color elements of pixels, in the portion of the image representing an area adjacent to the border of the tag. Other characteristics may also or alternatively be identified. The process flow may proceed to determining 745 at least a second characteristic associated with a background adjacent to or surrounding the identified article identification element. This step of determining a second characteristic may proceed similarly to the step of determining a second characteristic, and may include identifying one or more borders of the article identification element, extracting a portion of the image representing an area adjacent to the border of the article identification element, and determining at least a first characteristic, such as by generating a histogram of properties of pixels, such as color elements of pixels, in the portion of the image representing an area adjacent to the border of the article identification element. Other characteristics may also or alternatively be identified.

The process flow may then proceed to comparing 750 the at least a first characteristic and the at least a second characteristic. By way of example, the characteristics may be histograms of pixel characteristics, such as color, of a portion of the image, and the histograms may be compared. The process flow then proceeds to, referring to FIG. 7C, determining 755 whether the first characteristic and the second characteristic are within a threshold. If the first characteristic and the second characteristic are not within a threshold, the process flow may proceed to displaying 760 a prompt for a new image. In embodiments, the process flow may cause a device to generate an alert message to a store system to notify store personnel of possible fraud or theft. Responsive to determining that the first characteristic and the second characteristic are within the threshold, the process flow proceeds to storing data indicative of an identifier of the security tag, an identifier of the article, and an indication of association of the security tag with the article.

While the above describes an embodiment wherein a single image is captured and processed, further advantageous embodiments of the present disclosure include capturing multiple images or video(s), and performing similar image processing techniques thereon in order to confirm a security tag's association with an article and/or paper tag. More specifically, in one embodiment, a camera or imaging device may be used to capture a video, wherein the security tag, the paper tag or article identification element and the article each appear within frames of the video. The video may be analyzed to recognize, for example, continuity of the background between frames which contain the article, the security tag and the paper tag. Likewise, in other embodiments, an application may prompt a user guide the camera from a location of one tag, to the location of the other tag, wherein the camera may capture a plurality of images as it is moved (such that each of the paper tag and the security tag appear in at least one of the images of the plurality of images). Image processing software, and in particular, panoramic software, may be used to combine (or "stitch") overlapping fields of the images to generate a panoramic image. This panoramic image may be analyzed in accordance with the above-described embodiments, for example, to confirm an association between a paper tag and a security tag captured therein.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems. In embodiments, each of the steps of the methods described with reference to FIGS. 1-6 may be performed by an applications processing unit (APU), which may include one or more processors. Reference herein to an "application" may be to processor-executable instructions stored on one or more non-transitory computer-readable media of a device, and performance of one or more steps by an application may refer to performance of the steps by one or more processors executing instructions of the application and/or other devices controlled by the one or more processors executing the instructions of the application. In embodiments, one or more steps of a method may be performed manually, and/or manual verification, modification or review of a result of one or more processor-performed steps may be required in processing of a method.

The embodiments described herein are solely for the purpose of illustration. Those in the art will recognize that other embodiments may be practiced with modifications and alterations limited only by the claims.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A computer-implemented method for enabling the removal of a security tag from an article during a self-checkout process comprising:

with an imaging device, capturing at least one image of the security tag, the article identification element and the article, including generating a visual template indicating a preferred position of the security tag and the article identification element within a viewing screen of the imaging device;

analyzing, by at least one computer processor, the at least one image for determining if the security tag and the article identification element are attached to the same article;

upon a determination that the security tag and the article identification element are attached to the article, storing in a database an identifier of the security tag, an identifier of the article, and an indication of their association with the article;

determining whether payment has been received for the purchase of the article whose article identification element is stored in the database;

responsive to determining that payment has been received, identifying a security tag associated with the purchased article;

verifying that the identified security tag and the article ID element stored in the database are associated;

responsive to said verification, generating and transmitting a control signal for enabling at least one of the detachment and deactivation of the identified security tag from the article.

2. The method of claim 1, wherein the step of analyzing the at least one image for determining if the security tag and the article identification element are attached to the article comprises the steps of:

identifying the security tag captured in the at least one image;

identifying the article identification element captured in the at least one image;

determining at least one first characteristic associated with a background surrounding the identified security tag;

determining at least one second characteristic associated with a background surrounding the identified article identification element; and comparing the at least one first characteristic and the at least one second characteristic for determining if the security tag and the article identification element are attached to the article.

3. The method of claim 1, wherein the step of generating a visual template indicating a preferred position of the security tag and the article identification element within a viewing screen of an imaging device comprises the steps of:

generating a first window indicating an area in which to position the security tag; and generating a second window indicating an area in which to position the article identification element.

4. The method of claim 1, wherein the step of capturing at least one image of the security tag, the article identification element and the article comprises capturing a video, wherein the security tag, the article identification element and the article each appear within the video.

5. The method of claim 1, wherein the step of capturing at least one image of the security tag, the article identification element and the article comprises capturing a plurality of images, wherein each of the security tag, the article identification element and the article appear in at least one of the images of the plurality of images.

6. The method of claim 5, wherein the plurality of images have overlapping fields of view, and wherein the step of analyzing the at least one image further comprises generating a panoramic image by combining the plurality of images together.

7. A system for enabling the removal of a security tag from an article during a self-checkout process comprising:

an imaging device configured to capture at least one image;

a computer processor operatively connected to the imaging device and configured to:

analyze the at least one image for detecting a security tag and an article identification element;

responsive to detecting the security tag and the article identification element in the image, determine if the security tag and the article identification element are attached to the article by identifying the security tag captured in the at least one image; identifying the article identification element captured in the at least one image; determining at least one first characteristic associated with a background surrounding the identified security tag; determining at least one second characteristic associated with a background surrounding the identified article identification element; and comparing the at least one first characteristic and the at least one second characteristic to determine if the security tag and the article identification element are attached to the article;

store in a database, upon a determination that the security tag and the article identification element are attached to the same article, an identifier of the security tag, an identifier of the article, and an indication of their association with the article;

determine that payment has been received for the purchase of the article;

upon determination that payment has been received, identify an unlock code of the security tag associated with the purchased article; and generate and enable the transmission of a control signal including the unlock code for enabling at least one of the detachment and deactivation of the identified security tag from the article.

8. The system of claim 7, wherein the security tag comprises a receiver and a detachment mechanism operatively connected thereto, wherein the detachment mechanism is configured to unlock and permit the detachment of the security tag from the article in response to the receipt of the control signal including the unlock code.

9. The system of claim 7, wherein the imaging device is further configured to generate a visual template indicating a preferred position of the security tag and the article identification element within a viewing screen of the imaging device.

10. The system of claim 9, wherein the step of generating a visual template indicating a preferred position of a security tag and an article identification element within a viewing screen of an imaging device further comprises the steps of:

generating a first window indicating an area in which to position the security tag; and generating a second window indicating an area in which to position the article identification element.

11. The system of claim 7, wherein the step of capturing at least one image of the security tag, the article identification element and the article comprises capturing a video, wherein the security tag, the article identification element and the article each appear within the video.

12. The system of claim 7, wherein the step of capturing at least one image of the security tag, the article identification element and the article comprises capturing a plurality of images, wherein at least one of each of the security tag, the article identification element and the article appear in at least one of the images of the plurality of images.

13. The system of claim 12, wherein the plurality of images have overlapping fields of view, and wherein step of analyzing the at least one image further comprises generating a panoramic image by combining the plurality of images together.

14. A mobile computing device comprising:

an image capturing device;

a wireless communication device; and at least one processor operatively connected to the image capturing device and the wireless communication device and configured to:

with the image capturing device, capture at least one image of a security tag, an article identification element and an article, wherein the at least one processor is further configured to generate a visual template indicating a preferred position of the security tag and the article identification element within a viewing screen of the image capturing device;

receive data indicative that payment has been received for the purchase of the article;

upon receipt of data indicative that payment has been received, identify a security tag associated with the purchased article; and upon receipt of data indicative that the identified security tag and the captured article identification element are attached to the article, generate and transmit a control signal for enabling at least one of the detachment and deactivation of the identified security tag from the article.

15. The device of claim 14, wherein the at least one processor is further configured to receive an unlock code for detaching or deactivating the identified security tag.

* * * * *